(12) United States Patent
Pittion et al.

(10) Patent No.: US 6,185,947 B1
(45) Date of Patent: Feb. 13, 2001

(54) AIR CONDITIONING SYSTEM FOR A MOTOR VEHICLE

(75) Inventors: Laurent Pittion, Metz (FR); John F. O'Brien, Lockport, NY (US); Jean-Luc Menager, Meudon la Foret (FR)

(73) Assignees: Delphi Technologies, Inc., Troy, MI (US); Renault S.A. (FR)

(*) Notice: Under 35 U.S.C. 154(b), the term of this patent shall be extended for 0 days.

(21) Appl. No.: 09/378,646

(22) Filed: Aug. 20, 1999

(51) Int. Cl.$^7$ .................................................. F25B 49/02
(52) U.S. Cl. .................. 62/176.3; 62/176.6; 62/228.5; 62/229
(58) Field of Search .................. 62/229, 228.1, 62/228.4, 228.5, 160, 159, 176.1, 176.2, 176.3, 176.5, 176.6, 226, 227, 215, 208, 209

(56) References Cited

U.S. PATENT DOCUMENTS

| 5,074,123 | * | 12/1991 | Iida et al. ............................ | 62/228.5 |
| 5,769,316 | * | 6/1998 | Ikeda et al. ......................... | 62/160 X |
| 5,778,147 | * | 7/1998 | Kim ................................ | 62/176.2 X |

FOREIGN PATENT DOCUMENTS 60-181533 * 9/1985 (JP) ..................................... 62/176.3

* cited by examiner

*Primary Examiner*—Harry B. Tanner
(74) *Attorney, Agent, or Firm*—Patrick M. Griffin

(57) ABSTRACT

An air conditioning system (10) for a passenger compartment of a motor vehicle comprises a first heat exchanger (14) positionable outside the passenger compartment; a second heat exchanger (18) positionable inside the passenger compartment; an expansion device (16) positioned in a first fluid passage (22) between the heat exchangers; an electronically controlled variable stroke compressor (12) for pumping fluid into the second fluid passage and either in a first direction (X) or in a second direction (Y); reverse flow means (32) in the second fluid passage for controlling the direction of the flow of fluid; first sensing means (36) providing a first output signal indicative of the actual temperature of the air leaving the second heat exchanger; second sensing means (40) providing a second output signal indicative of the humidity of the air leaving the second heat exchanger; third sensing means (46) providing a third output signal indicative of the temperature of the air in the passenger compartment; and control means (26,30) electrically connected to the first, second and third sensing means and to the compressor for receiving the first, second, and third output signals, for determining a maximum temperature for the air leaving the second heat exchanger dependent on the second and third output signals, for comparing the determined maximum temperature to the actual temperature, and for controlling the stroke of the compressor to maintain the actual temperature at or below the determined maximum temperature during fluid flow in the second direction. Reduces the risk of unacceptable levels of hot saturated air reaching the passenger compartment.

8 Claims, 3 Drawing Sheets

AIR CONDITIONING SYSTEM FOR A MOTOR VEHICLE

TECHNICAL FIELD

The present invention relates to an air conditioning system for the passenger compartment of a motor vehicle, and more particularly to an air conditioning system which can provide both heating and cooling for the passenger compartment; and to a method of operating such an air conditioning system.

BACKGROUND OF THE INVENTION

Air conditioning systems for the passenger compartments of motor vehicles are well known. In general, these systems comprise an inside heat exchanger (located within the passenger compartment) and an outside heat exchanger (located outside the passenger compartment). A pair of fluid passages connect the heat exchangers to allow the circulation of fluid through the heat exchangers. An expansion device is positioned in one of the fluid passages. A compressor and accumulator/dryer is positioned in the other fluid passage. When fluid is pumped by the compressor through the outside heat exchanger, the expansion device, the inside heat exchanger and the accumulator/dryer in succession, air passing through the inside heat exchanger is cooled as the air flows into the passenger compartment. When fluid is pumped in the reverse direction through the inside heat exchanger, the expansion device, the outside heat exchanger and the accumulator/dryer in succession, air passing through the inside heat exchanger is heated as the air flows into the passenger compartment. A reversing valve can be positioned in the other fluid passage to provide the required flow direction for the fluid.

During the cooling cycle, the air passing through the inside heat exchanger may be de-humidified, leading to a build-up of condensation on the inside heat exchanger. During a subsequent heating cycle, the condensation may be evaporated, increasing the risk of hot saturated air entering the passenger compartment. This potential problem may be avoided either by limiting the time of the heating cycle, or by using a second inside heat exchanger during the heating cycle (with the first inside heat exchanger only being used during a cooling cycle). Both of these potential solutions have limitations.

SUMMARY OF THE INVENTION

It is an object of the present invention to overcome the above mentioned problem.

An air conditioning system in accordance with the present invention for a passenger compartment of a motor vehicle comprises a first heat exchanger positionable outside the passenger compartment; a second heat exchanger positionable inside the passenger compartment; a first fluid passage between the first and second heat exchangers; a second fluid passage between the first and second heat exchangers; an expansion device positioned in the first fluid passage; an electronically controlled variable stroke compressor for pumping fluid into the second fluid passage and either in a first direction sequentially through the first heat exchanger, the expansion device, and the second heat exchanger, or in a second direction sequentially through the second heat exchanger, the expansion device, and the first heat exchanger; reverse flow means in the second fluid passage for controlling the direction of the flow of fluid; first sensing means providing a first output signal indicative of the actual temperature of the air leaving the second heat exchanger; second sensing means providing a second output signal indicative of the humidity of the air leaving the second heat exchanger; third sensing means providing a third output signal indicative of the temperature of the air in the passenger compartment; and control means electrically connected to the first, second and third sensing means and to the compressor for receiving the first, second, and third output signals, for determining a maximum temperature for the air leaving the second heat exchanger dependent on the second and third output signals, for comparing the determined maximum temperature to the actual temperature, and for controlling the stroke of the compressor to maintain the actual temperature at or below the determined maximum temperature during fluid flow in the second direction.

Because of the use of an electronically controlled variable stroke compressor, the present invention allows more precise control of the pumping capacity of the compressor when the air conditioning system is heating the passenger compartment. The present invention provides an air conditioning system which operates dependent on sensed conditions to reduce the risk of unacceptable levels of hot saturated air reaching the passenger compartment without the need for limiting the time of operation of the heating cycle and without the need for another heat exchanger inside the passenger compartment.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
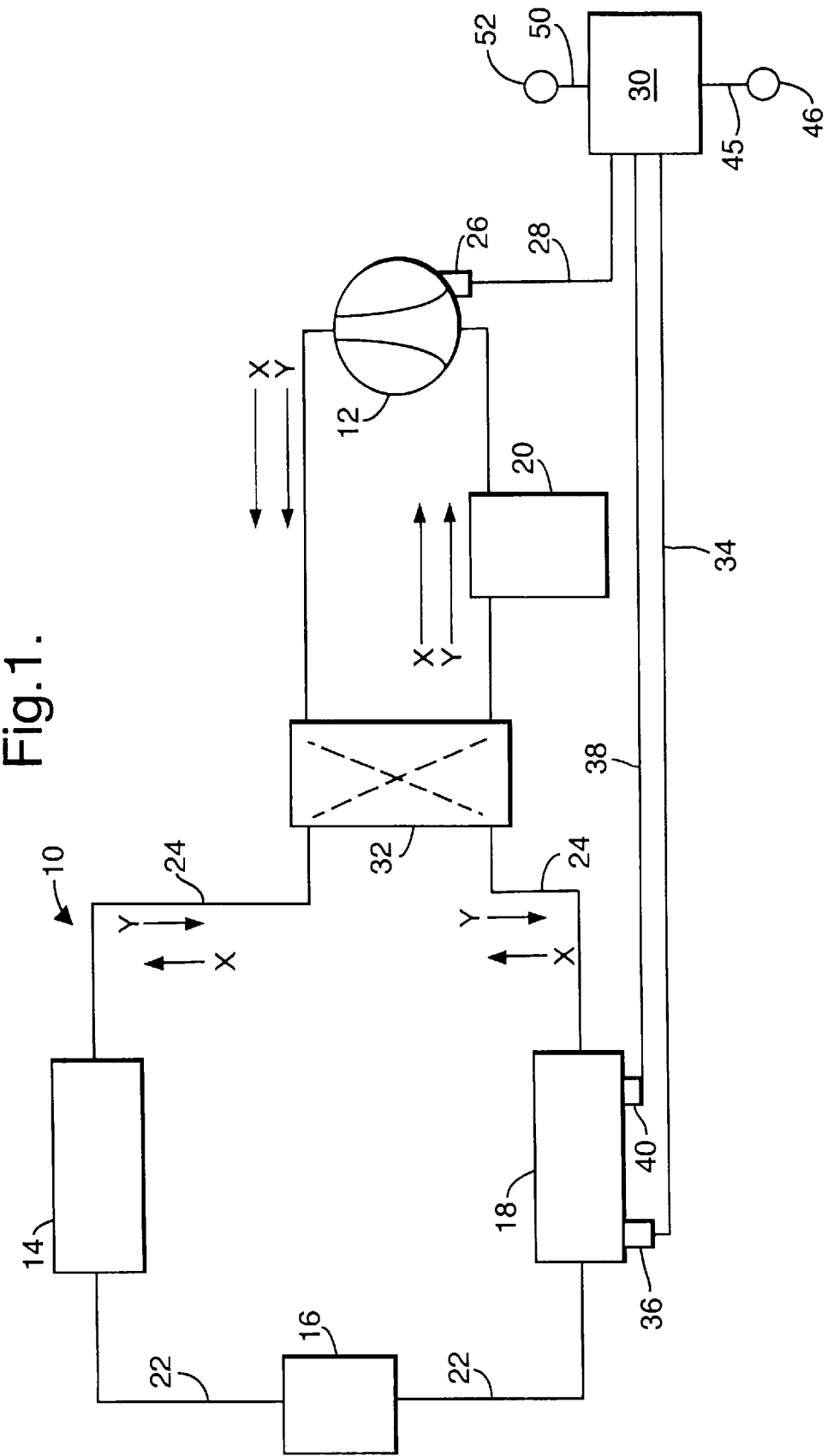
FIG. 1 is a schematic view of an air conditioning system in accordance with the present invention.

Referring to FIG. 1 of the drawings, the air conditioning system 10 in accordance with the present invention is for use in a motor vehicle for heating or cooling the passenger compartment (not shown) of the motor vehicle. The air conditioning system 10 comprises the usual components of a compressor 12, an outside heat exchanger 14, an orifice tube or other expansion device 16 (such as a thermal expansion valve), an inside heat exchanger 18, and an accumulator/dryer 20. A first fluid passage 22 fluidly connects the outside heat exchanger 14 with the inside heat exchanger 18 by way of the expansion device 16. A second fluid passage 24 fluidly connects the outside heat exchanger 14 with the inside heat exchanger 18 by way of a reversing valve 32. The compressor 12 and the accumulator/dryer 20 fluidly connect with the second fluid passage 24 by way of the reversing valve 32.

During normal (cooling) operation of the air conditioning system 10, the reversing valve 32 is set to allow fluid flow in the direction X such that air passing through the inside heat exchanger 18 is cooled so that the air conditioning system operates to cool the passenger compartment.

When initial, supplemental, or prolonged heating of the passenger compartment is required, the reversing valve 32 is actuated to reverse the flow of refrigerant fluid (in the direction Y) through the inside heat exchanger 18, the orifice tube 16 and the outside heat exchanger 14. In this mode, the air conditioning system 10 acts like a heat pump such that air passing through the inside heat exchanger 18 is heated so that the air conditioning system operates to heat the passenger compartment.

Figure 2:
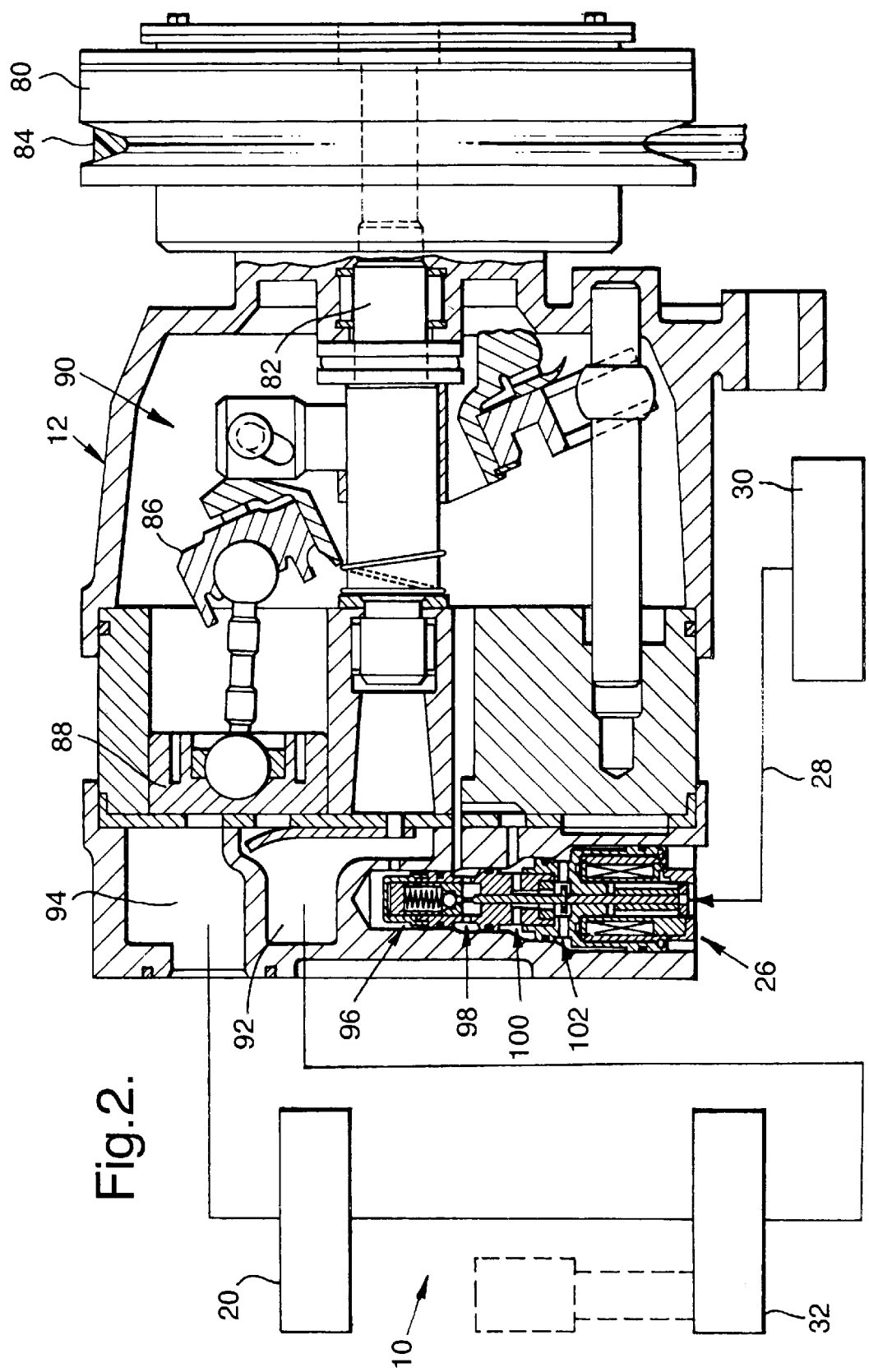
FIG. 2 is a cross-sectional view of a compressor and control valve for use in the air conditioning system of FIG. 1.

The compressor 12 is an electronically variable compressor the operation of which is controlled by an electronic displacement control valve 26. An example of a suitable compressor 12 and control valve 26 is shown in FIG. 2. The compressor 12 shown in FIG. 2 is a wobble plate compressor. As an alternative, a swash plate compressor may be used.

The compressor 12 includes a pulley 80 which is connected to a rotatable shaft 82, and which is driven by a belt 84. A wobble plate 86 is mounted on the shaft 82. The wobble plate 86 is connected to one or more pistons 88. A crankcase chamber 90 is positioned on one side of the pistons 88, with the wobble plate 86 positioned in the crankcase chamber. An outlet chamber 92 and a inlet chamber 94 is positioned on the opposite side of the pistons. The inlet chamber 94 is fluidly connected to the accumulator 20. The outlet chamber 92 is fluidly connected to the reversing valve 32. The other components of the air conditioning system 10 are fluidly connected as shown in FIG. 1. Fluid flow through the chambers 90, 92, 94, and hence the fluid pressure in the chambers, is controlled by the control valve 26.

The control valve 26 has a first port 96 fluidly connected to the outlet chamber 92; a second port 98 fluidly connected to, and acting as an inlet to, the crankcase chamber 90; a third port 100 fluidly connected to, and acting as an outlet from, the crankcase chamber 90; and a fourth port 102 fluidly connected to the inlet chamber 94. The control valve 26 is electrically connected by a line 28 to a control unit 30 which is preferably a microprocessor or other computer control unit. The control unit 30 is electrically connected by a line 34 (FIG. 1) to a temperature sensor 36 which monitors the temperature of the air leaving the inside heat exchanger 18; by a line 38 to an air humidity sensor or air dew point sensor 40 which monitors the humidity of the air leaving the inside heat exchange; and by a line 45 to a temperature sensor 46 monitoring the temperature inside the passenger compartment. The control unit 30 may also be electrically connected by a line 50 to a manually operated control device 52 located inside the passenger compartment and operable by a passenger in the motor vehicle to select a required temperature inside the passenger compartment.

The stroke of the compressor 12 (or, more precisely, the displacement or stroke of the pistons 88) is controlled by the operation of the control valve 26. The duty cycle of the control valve 26 is actuated to adjust crankcase fluid pressure Pc in the crankcase chamber 90; the inlet suction fluid pressure Ps in the inlet chamber 94; and the discharge fluid pressure Po in the outlet chamber 92. When the crankcase fluid pressure Pc is substantially the same as the inlet suction fluid pressure Ps, the stroke of the compressor 12 is at a maximum. When the crankcase fluid pressure Pc is greater than the inlet suction fluid pressure Ps, the stroke of the compressor 12 is reduced from the maximum stroke. By suitable control of the control valve 26, the stroke of the compressor 12 can be controlled.

In an alternative arrangement, the stroke of the compressor 12 may be controlled by an electronic control valve that meters fluid flow from the outlet chamber 92 to the crankcase chamber 90 and uses a fixed bleed from the crankcase chamber to the inlet chamber 94. In a further alternative, the reverse arrangement may be used—that is metering fluid flow from the crankcase chamber 90 to the inlet chamber 94 and using a fixed bleed from the outlet chamber 92 to the crankcase chamber. As with the duty cycle arrangement described above, these alternative arrangements also control the stroke of the compressor 12 by effecting the pressure in the crankcase chamber 90 and the pressure balance across the piston 88.

In accordance with the present invention, the control unit 30 monitors the signals from the sensors 36, 40, 46 and the control device 52 and controls the operation of the control valve 26, and hence the operation of the compressor 12 dependent on the sensed signals. Such an arrangement provides more precise control of the pumping capacity of the compressor 12 during the heating cycle of the air conditioning system 10 when the passenger compartment is being heated in order to substantially prevent an unacceptable build-up of hot saturated air reaching the passenger compartment.

Figure 3:
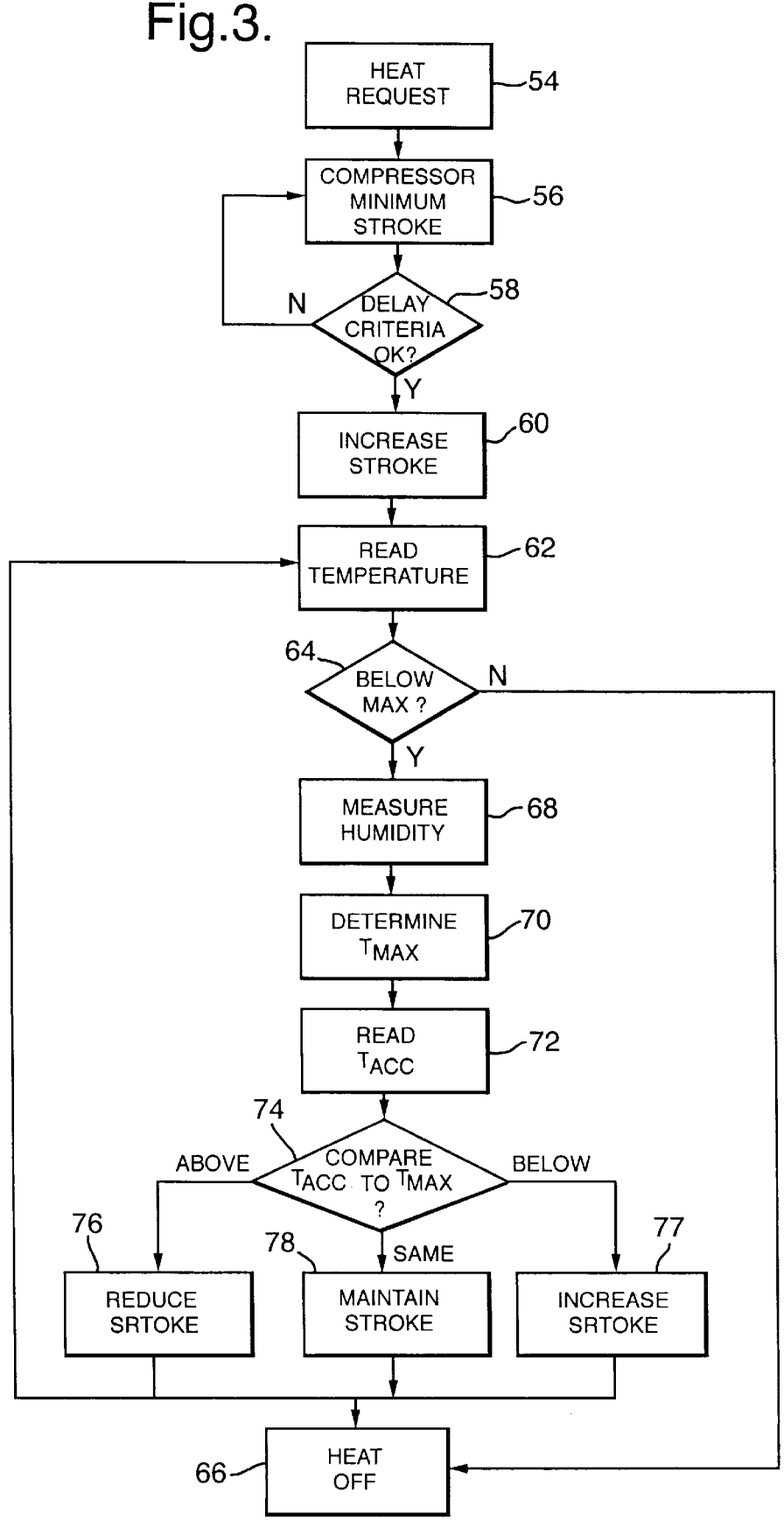
FIG. 3 is a flow chart showing one example of control of the compressor of the air conditioning system of FIG. 1.

The control sequence performed by the control unit 30 for the operation of the compressor 12 during passenger compartment heating is shown in FIG. 3. The sequence begins with an initial request, step 54, for passenger compartment heating. The control unit 30 actuates the control valve 26 to provide a minimum operating stroke for the compressor 12 at step 56. The control unit 30 then checks that any delay criteria are met at step 58. If not, the control unit returns to step 56. If yes, the control unit 30 proceeds to step 60 and actuates the control valve 26 to increase the stroke of the compressor 12. Next, at step 62, the control unit 30 monitors the temperature reading from the sensor 46 and at step 64 compares this temperature reading to a predetermined maximum level. If the temperature reading from the sensor 46 is equal to or above the predetermined maximum, the control unit 30 turns off the compressor 12 (step 66). If the temperature reading from the sensor 46 is below the predetermined maximum, the control unit 30, at step 68, monitors the humidity reading from the sensor 40. Next, at step 70, the control unit 30 determines a maximum temperature $T_{MAX}$ based on the measured readings from the sensors 40 and 46. The value of $T_{MAX}$ is a predetermined maximum value for the temperature of the air leaving the inside heat exchanger 18, at the measured readings from the sensors 40 and 46, above which there is a significant risk of the generation of an unacceptable build-up of hot saturated air reaching the passenger compartment. The predetermined values for $T_{MAX}$ may be determined experimentally or by calculation. At step 72, the control unit 30 monitors the actual value of the temperature $T_{ACC}$ of the air leaving the second heat exchanger 18 from the sensor 36. Next, at step 74, the control unit 30 compares the value of $T_{ACC}$ measured at step 72 to the value of $T_{MAX}$ determined at step 70. If $T_{ACC}$ is above $T_{MAX}$, the control unit 30 actuates the control valve 26 to reduce the stroke of the compressor 12 at step 76. If $T_{ACC}$ is below $T_{MAX}$, the control unit 30 actuates the control valve 26 to increase the stroke of the compressor 12 at step 77. If $T_{ACC}$ is equal to $T_{MAX}$, the control unit 30 leaves the control valve 26 unchanged to maintain the stroke of the compressor 12 at step 78. Following step 76, or step 77, or step 78, the control unit 30 returns to step 62 and repeats the subsequent sequence, or goes to step 66 if passenger compartment heating is no longer required.

The present invention therefore provides closed-loop control of the operation of the compressor 12 based on measured parameters. By maintaining the actual temperature $T_{ACC}$ of the air leaving the inside heat exchanger 18 at or below the determined maximum temperature $T_{MAX}$ for the measured humidity of the air leaving the inside heat exchanger and the passenger compartment temperature, the risk of unacceptable levels of hot saturated air reaching the passenger compartment is significantly reduced.

In an alternative arrangement, because the actual temperature $T_{ACC}$ of the air leaving the inside heat exchanger 18 are dependent on fluid pressure, the discharge pressure from the compressor 12 may be measured, and the value used by the control unit 30 to calculate the value of the actual temperature, rather than use the sensor 36 to measure the actual temperature. In this case, the discharge pressure may be compared to a maximum pressure which can be equated to the determined maximum temperature $T_{MAX}$ for controlling the operation of the compressor 12.

Alternative reverse flow means, rather than the reversing valve 32, may be provided in the air conditioning system in accordance with the present invention. The control unit 30 may also be connected to the reversing valve 32 for controlling operation of the reversing valve.

What is claimed is:

1. An air conditioning system for a passenger compartment of a motor vehicle comprises a first heat exchanger positionable outside the passenger compartment; a second heat exchanger positionable inside the passenger compartment; a first fluid passage between the first and second heat exchangers; a second fluid passage between the first and second heat exchangers; an expansion device positioned in the first fluid passage; an electronically controlled variable stroke compressor for pumping fluid into the second fluid passage and either in a first direction sequentially through the first heat exchanger, the expansion device, and the second heat exchanger, or in a second direction sequentially through the second heat exchanger, the expansion device, and the first heat exchanger; reverse flow means in the second fluid passage for controlling the direction of the flow of fluid; first sensing means providing a first output signal indicative of the actual temperature of the air leaving the second heat exchanger; second sensing means providing a second output signal indicative of the humidity of the air leaving the second heat exchanger; third sensing means providing a third output signal indicative of the temperature of the air in the passenger compartment; and control means electrically connected to the first, second and third sensing means and to the compressor for receiving the first, second, and third output signals, for determining a maximum temperature for the air leaving the second heat exchanger dependent on the second and third output signals, for comparing the determined maximum temperature to the actual temperature, and for controlling the stroke of the compressor to maintain the actual temperature at or below the determined maximum temperature during fluid flow in the second direction.

2. An air conditioning system as claimed in claim 1, wherein the control means comprises a microprocessor electrically connected to the first, second and third sensing means, and a control valve connected to the compressor and operated by the microprocessor to control the stroke of the compressor.

3. An air conditioning system as claimed in claim 1 or claim 2, wherein the first sensing means is a temperature sensor which monitors the temperature of the air leaving the second heat exchanger.

4. An air conditioning system as claimed in claim 1, further comprising a manually operable control device which is electrically connected to, and providing an output signal to, the control means.

5. An air conditioning system as claimed in claim 4, wherein the reverse flow means comprises a reversing valve.

6. A method of operating an air conditioning system as claimed in claim 5, comprising the steps of determining the temperature of the air leaving the second heat exchanger; measuring the humidity of the air leaving the second heat exchanger; measuring the temperature of the air in the passenger compartment; determining a maximum temperature for the air leaving the second heat exchanger based on the measured humidity and the measured temperature of the air in the passenger compartment; comparing the determined maximum temperature for the air leaving the second heat exchanger with the determined temperature of the air leaving the second heat exchanger; and controlling the stroke of the compressor to maintain the determined temperature at or below the determined maximum temperature.

7. A method as claimed in claim 6, wherein the maximum temperature is determined from predetermined values of the maximum temperature which have been derived experimentally from measured values for the humidity of the air leaving the second heat exchanger and the temperature of the air in the passenger compartment.

8. A method as claimed in claim 7, wherein the step of determining the temperature of the air leaving the second heat exchanger comprising measuring the temperature of the air leaving the second heat exchanger.

\* \* \* \* \*